United States Patent [19]
Matty

[11] 3,974,992

[45] Aug. 17, 1976

[54] VEHICLE VELOCITY LIMIT CONTROL METHOD AND APPARATUS

[75] Inventor: Thomas C. Matty, North Huntingdon, Pa.

[73] Assignee: Westinghouse Electric Corporation, Pittsburgh, Pa.

[22] Filed: Mar. 13, 1975

[21] Appl. No.: 558,106

[52] U.S. Cl. .................... 246/182 B; 246/187 B
[51] Int. Cl.² .......................................... B61L 3/12
[58] Field of Search .......... 246/34 R, 34 CT, 182 R, 246/182 B, 182 C, 187 B, 187 C, 122 R; 235/150.2, 150.24

[56] References Cited
UNITED STATES PATENTS

| | | | |
|---|---|---|---|
| 3,519,805 | 7/1970 | Thorne-Booth | 235/150.2 |
| 3,728,539 | 4/1973 | Thorne-Booth | 246/182 B |
| 3,799,057 | 3/1974 | Cassel | 246/182 B |
| 3,891,167 | 6/1975 | Perry | 246/34 R |

*Primary Examiner*—Trygve M. Blix
*Assistant Examiner*—Reinhard J. Eisenzopf
*Attorney, Agent, or Firm*—R. G. Brodahl

[57] ABSTRACT

In a transportation vehicle control system, a signal is detected from a transposed cable to determine the vehicle position relative to a predetermined speed control zone. This position data, along with other manual and/or automatic inputs, is fed into a profile function generator whose output is a predetermined singular function of the position and other inputs. While the vehicle is within the speed control zone, the output of the profile function generator is converted from digital form into analog form and then used to limit the vehicle speed.

18 Claims, 7 Drawing Figures

VEHICLE VELOCITY LIMIT CONTROL METHOD AND APPARATUS

BACKGROUND OF THE INVENTION

In a transportation system, it is necessary to limit the speed of the transportation vehicles over predetermined zones along the vehicle paths (e.g. around curves or at passenger stations). The speed must be limited according to a profile which is acceptable to the comfort of vehicle passengers and which is compatible with the operational objectives of the transportation system. An example of such a speed limiting control system is shown in U.S. Pat. No. 3,519,805.

Because different operational objectives of a transportation system demand different speed limiting profiles, the choice of speed limiting profile depends first on the objectives of the particular transportation system in which the vehicle is operating. For example, if the object of the transportation system is to maximize the energy dissipation capacity of the vehicles, a constant energy speed limiting profile would be required; whereas if the system objectives were to minimize starting and stopping time of the vehicles, a constant deceleration speed limiting profile would be required. In prior art transportation systems for controlling vehicle speed, it has been difficult to change the speed limiting profile to accord with a change in the systems operational objectives after a first set of objectives has been implemented.

Whatever speed limiting profile is demanded by the transportation system's objectives, this profile must be modified to comport with the comfort of the vehicle passengers. Although these modifications may occur over only a relatively small portion of the speed control zone and may be relatively small in magnitude, they are essential. In prior art systems, these modifications have been expensive and difficult to implement.

SUMMARY OF THE INVENTION

According to the present invention, the speed of a vehicle in a transportation system may be limited over a predetermined control zone according to a selected singular function of velocity with respect to distance.

As the vehicle enters the control zone, antennas aboard the vehicle intercept a signal from a transposed cable which parallels the vehicle pathway. The antennas detect antiphase conditions in the wayside signal to provide null condition signals to respective signal detectors. The antennas are disposed relative to each other such that they alternately provide null conditions each time the vehicle travels one-half the distance between crossover points on the transposed cable.

The signal detectors, which are sensitive to a single predetermined base frequency, produce an enable signal which allows an output from the present velocity limit control apparatus and which also allows information previously stored in a distance logic generator to enter a distance counter. The information stored in the distance logic generator represents the pathway distance over which the velocity limit controller is to be operative.

The signal detectors also produce a separate, second signal to the distance counter. When the distance counter beings receiving this second signal from the signal detectors it begins counting down the distance signal it receives from the distance logic generator to determine the distance left to travel in the speed limiting zone.

A signal representing this distance left to travel is sent to a profile function generator whose output is a selected one of a plurality of predetermined singular functions of the distance left to travel. The output of the profile function generator passes through a digital to analog converter and is then placed in an auctioneering circuit with the automatic train operation speed signal so that the lower of these two signals determines the speed signal delivered to the vehicle speed controller.

Additional signal detectors sensitive to frequencies other than the predetermined base frequency used for the first signal detectors may be used to automatically provide information to the distance logic generator. When it is desired to store a particular bit of information in the distance logic generator, the frequency necessary to activate the appropriate signal detector may be sent over the transposed cable. Since the signal detectors are each tuned to selected frequencies, only the desired signal detector will respond to the selected frequency.

DESCRIPTION OF THE PREFERRED EMBODIMENT

Figure 1:
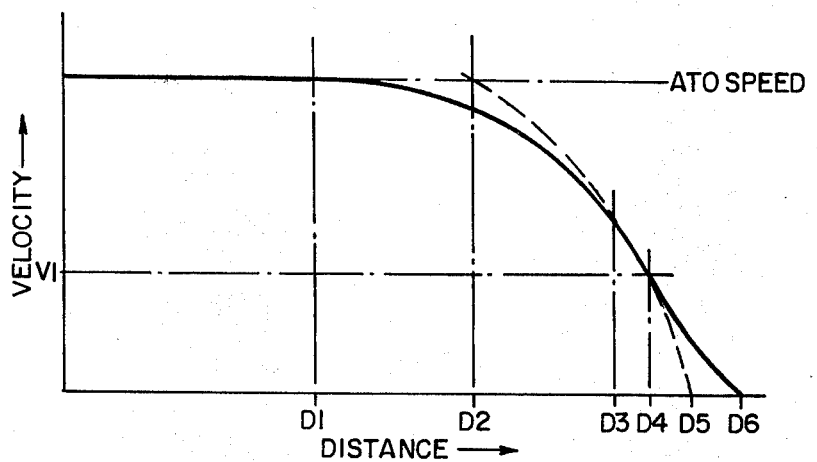
FIG. 1 illustrates a well known constant deceleration velocity distance profile.

Although the present invention could generate any desired singular function of velocity as a function of distance, this embodiment will refer only to the modified constant deceleration stopping profile seen in FIG. 1.

It is well known that, for a transportation system in which one of the principal objectives is to minimize stopping time of the vehicles, a constant deceleration vehicle stopping profile would be desirable. However, it is also recognized that passenger comfort demands that this constant deceleration profile be modified by decreasing the rate of change of deceleration so as to avoid "jerking" the vehicle into deceleration at the point at which the vehicle begins to decelerate and out of deceleration at the point at which the vehicle stops. The stopping profile of FIG. 1, therefore, requires that the vehicle travel at some controlled automatic train operating (ATO) speed until the distance point D1 is reached, where a modified deceleration is to begin and is to continue until the distance point D6 is reached. If a pure constant deceleration were used, the vehicle could begin decelerating at distance point D2 and would stop at distance point D5. However, for passenger comfort, it is desirable to decrease the rate of deceleration between distance points D1 and D3 and between distance points D4 and D6 to allow the vehicle to begin decelerating smoothly and to come to a smooth stop.

Figure 2:
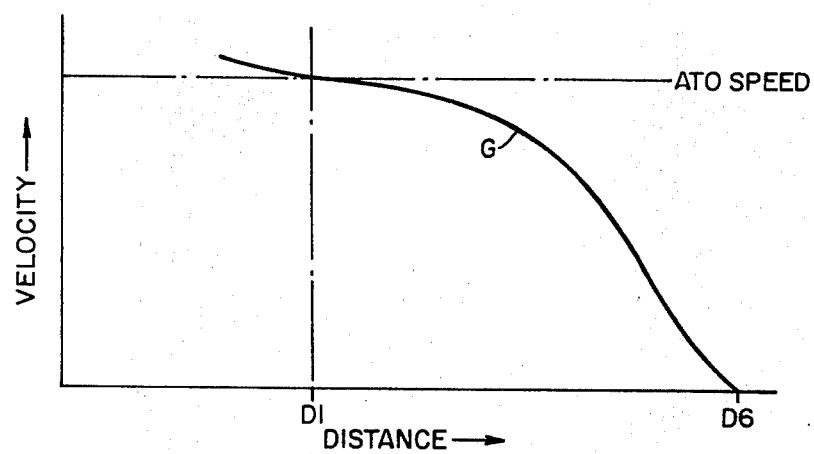
FIG. 2 illustrates the well known automatic train operation (ATO) velocity-distance profile and the velocity limit controller velocity-distance profile which could be used to synthesize the modified constant deceleration velocity distance profile of FIG. 1.

In FIG. 2 it is seen that the velocity profile of FIG. 1 can be synthesized from a constant ATO speed and a modified constant deceleration velocity limit signal which crosses the ATO velocity at distance point D1 and reaches zero velocity at distance point D6.

Figure 3:
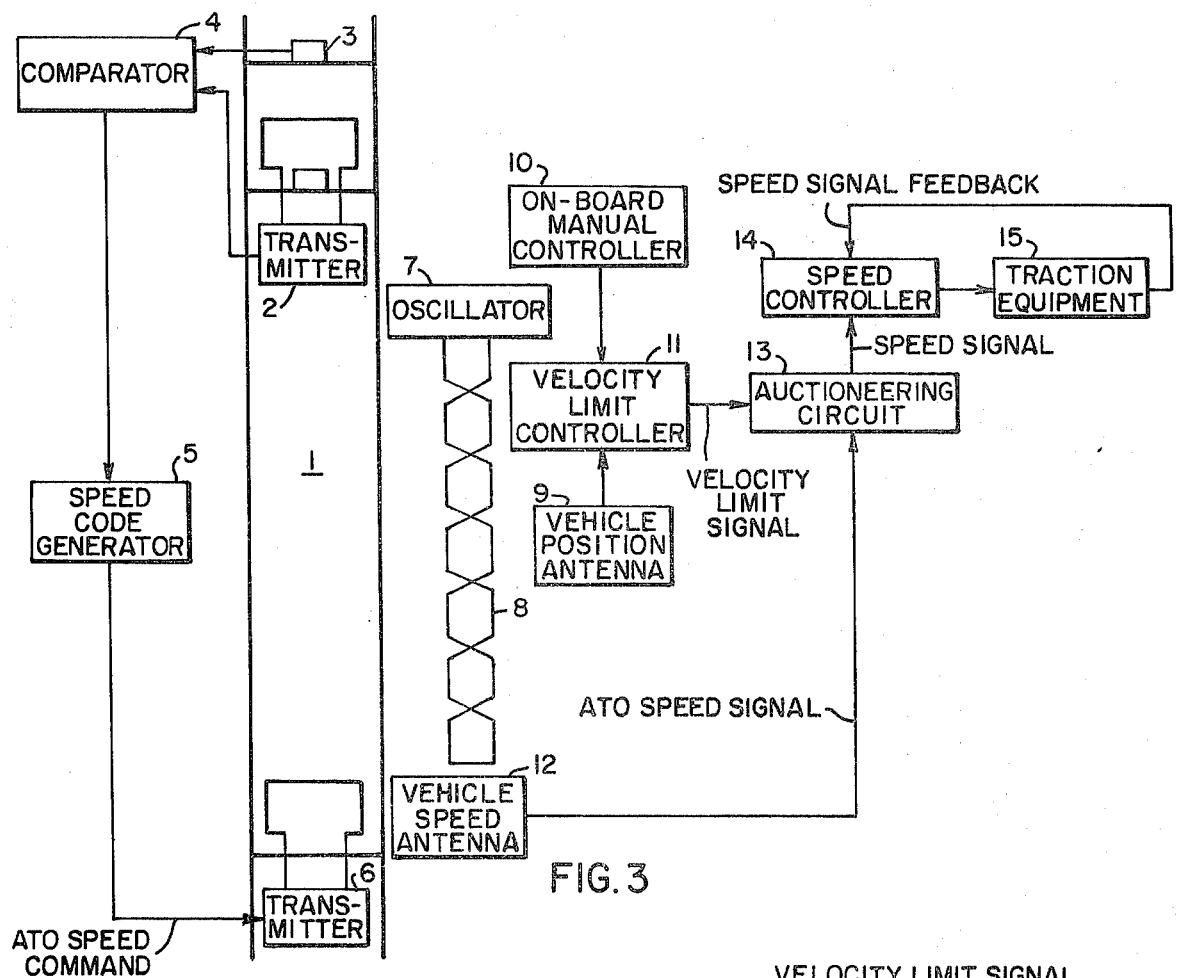
FIG. 3 illustrates the present velocity limit controller in relation to a practical vehicle transportation system.

FIG. 3 is a block diagram of an illustrative transportation system in which the present velocity limit controller may be utilized. The vehicle pathway 1 includes metal rails which will accommodate the vehicle wheels. A first signal transmitter 2 transmits a signal through these metal rails which is received by a signal receiver 3. The signal of transmitter 2 is also sent to a comparator 4 where it is compared with the signal received by signal receiver 3. By using the relative strength of the transmitter and receiver signals, the comparator 4 can detect whether there is a vehicle occupancy in the signal block between the transmitter and receiver. If no vehicle is present, the comparator sends a signal to the speed code generator 5 which uses this signal, along with other inputs, to determine the speed code value of the automatic train operation (ATO) signal. The ATO signal is then conveyed to pathway 1 through a second transmitter 6. The transportation system thus far described in relation to FIG. 3 is well known and is explained in U.S. Pat. No. 3,821,544 of T. C. Matty.

An oscillator 7 provides a constant frequency signal (e.g. 7 Kilohertz) to a transposed cable 8 which establishes a speed control zone and parallels the vehicle pathway 1. Such a transmitter and transposed cable combination is also well known and is explained in U.S. Pat. No. 3,728,539 of G. M. ThorneBooth. As the vehicle passes along the pathway 1, a vehicle position antenna 9 carried by the vehicle detects a no-signal condition until it intercepts a signal from the transposed cable. After the vehicle position antenna intercepts a signal from the transposed cable it detects antiphase conditions in the transposed cable. The signals from this vehicle antenna 9, along with other inputs (e.g. train length) which may be from an on-board manual controller 10 or other means described later, are used in the velocity limit controller 11 to produce the desired velocity limit signal as will be described later. The ATO signal is received by the vehicle from the pathway rails through a vehicle speed antenna 12.

The velocity limit signal from the velocity limit controller 11 and the ATO speed signal from the vehicle speed antenna 12 are compared in an auctioneering circuit 13 and the lower of these signals provides a speed control signal to the speed controller 14. The speed controller 14 compares this speed control signal with a speed feedback signal from the traction equipment 15 and sends an appropriate signal to the traction propulsion equipment 15 which is used to propel the vehicle. The traction equipment 15 may comprise a well known control chopper (or equivalent apparatus), motor, gears, axles, and wheels.

Figure 5:
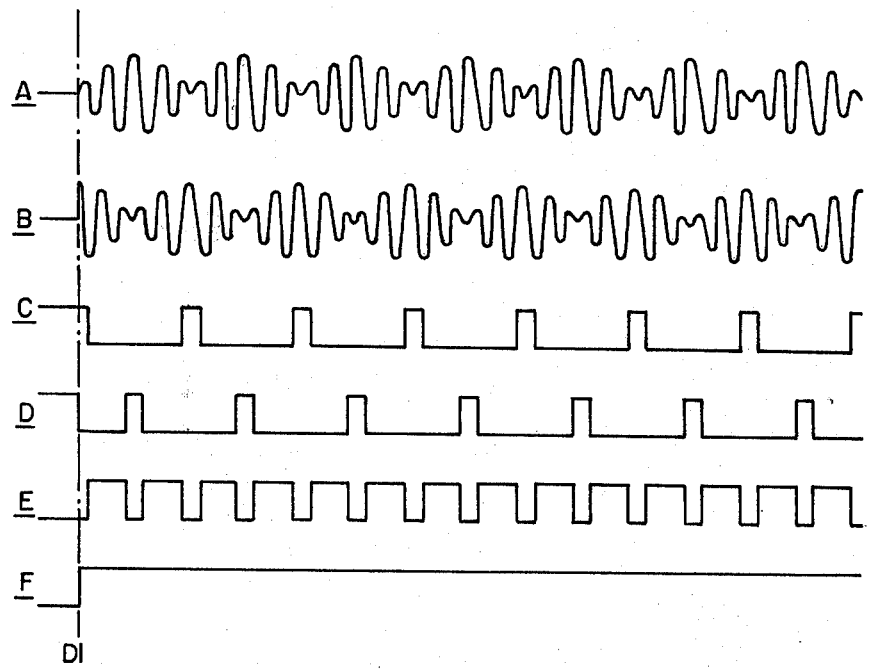
FIG. 5 illustrates signals at various points in the functional block diagram of FIG. 4.
Figure 4:
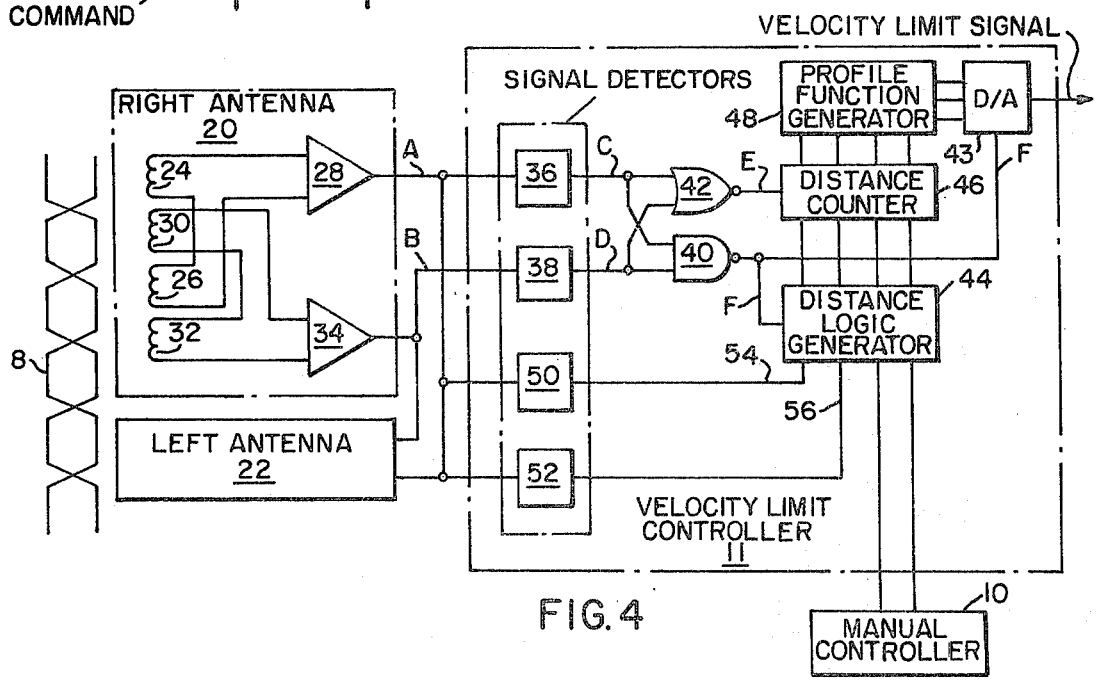
FIG. 4 is a functional block diagram of the present velocity limit controller.

A functional block diagram of the velocity limit controller 11 is shown in FIG. 4. Both a right side antenna 20, and an identical left side antenna 22 are provided so that the signal from the transposed cable 8 may be intercepted regardless of the orientation and movement direction of the vehicle. The right antenna 20 includes coils 24 and 26 connected to preamplifier 28 and coils 30 and 32 connected to preamplifier 34. Coils 24 and 26 are spaced apart by a distance equal to one-half the distance between the predetermined crossover points of transposed cable 8. Likewise, coils 30 and 32 are also spaced apart by a distance equal to one-half the distance between crossover points of the transposed cable. In addition, the coils are electrically connected so that voltage induced in coil 24 opposes the voltage induced in coil 26 while a crossover point is between coils 24 and 26, and voltage induced in coil 30 opposes the voltage induced in coil 32 while a crossover point is between coils 30 and 32. Because of this spacing between coils and since the coils are connected so that each coil opposes its associated coil partner when there is a crossover point between them, preamplifier 28 or 34 will produce a null condition only while each coil of the pair is receiving an equal induced voltage of opposite polarity from the transposed cable. (i.e., once every time the vehicle moves a distance equal to the distance between crossover points). The use of opposing pairs of coils in this manner to produce null output signal conditions is preferable to a single coil which would read null conditions at the transposed cable crossover points, because the opposing pair of coils is less susceptible to noise. The outputs of preamplifiers 28 and 34 are shown in FIGS. 5A and 5B, where signal A represents the output of preamplifier 28 and signal B represents the output of preamplifier 34. It will also be seen from FIG. 5 that signals A and B are out of phase with respect to each other. This is because the pair of coils 24 and 26 is spaced apart from the pair of coils 30 and 32 by a distance equal to one-half the distance between crossover points on the transposed cable 8. The result of this spacing is that one of the preamplifiers produces a null condition each time the vehicle moves a distance equal to one-half the distance between crossover points of the transposed cable.

The outputs of preamplifiers 28 and 34 are sent to first and second signal detectors 36 and 38 respectively as shown in FIG. 4. Signal detectors 36 and 38 are frequency sensitive devices which are turned to the base frequency of the transposed cable 8 and which may consist of the apparatus shown and described in relation to FIG. 6 or a well known equivalent device such as a Signetics 567 integrated circuit. The outputs of signal detectors 36 and 38 are shown in FIGS. 5C and 5D respectively, and are at one level when receiving a signal of base frequency and are at a relatively higher level when receiving a null signal.

The outputs of signal detectors 36 and 38 are sent to a first switching gate 40 shown as a NAND device and producing an enable signal F (FIG. 5F) which is at one level when signals C and D are both high, and which is otherwise at a relatively higher level. While the enable signal F is relatively low, it will prevent any output from the digital to analog converter 43 thereby preventing any output from the velocity limit controller 11. When the enable signal F becomes high, it will allow an output from both the digital to analog converter 43 and also the distance logic generator 44.

The distance logic generator 44 receives inputs from either manual or automatic sources (as will be discussed later) and, when the enable signal F becomes high, provides an output which represents the pathway distance over which the velocity limit controller is to provide a signal to the auctioneering circuit 12 shown in FIG. 3. This pathway distance value or magnitude is predetermined in relation to each potential combination of inputs to the distance logic generator 44, so the pathway distance may vary according to the distance logic generator inputs. Such a distance logic generator may be comprised of read only memories.

The outputs of signal detectors 36 and 38 are also sent to a second switching gate 42 shown as a NOR device and producing a distance counter signal E (shown in FIG. 5E) which is at one level when either of signals C or D is high, and which is at a relatively higher level otherwise. As explained earlier, signals C and D are high only when respective signal detectors 36 and 38 receive null signals from preamplifiers 28 and 34, and preamplifiers 28 and 34 alternatively produce a null signal each time the vehicle travels one-half the distance between crossover points on the transposed cable. Therefore, distance counter signal E has a low pulse signal each time the vehicle travels one-half the distance between crossover points on the transposed cable 8.

The pathway distance value determined by the distance logic generator 44 is sent to the distance counter 46 where it is counted down according to the low pulse signals received on the distance counter signal E. Therefore, the output signal of the distance counter 46 represents, at any time after the velocity limit controller begins generating a signal, the remaining pathway distance over which a velocity limit signal is to be produced, accurate to within one-half the distance between transposed cable crossover points. This signal representing the remaining pathway distance is sent to the profile function generator 48.

The output of the profile function generator 48 represents the digital form of the desired velocity limit signal. This output may be any predetermined singular function of the remaining pathway distance signal received from the distance counter 46 including a function of at least the second and third time derivatives of the output of the distance counter 46. Such a profile function generator 48 could be comprised of read only memories. In this example of the preferred embodiment, the output of the profile function generator 48 is the digital signal necessary to cause the digital to analog converter 43 to produce the velocity limit signal G shown in FIG. 2. This output of the profile function generator 48 is sent to the digital to analog converter 43 where, when the enable signal F is high, the velocity limit signal G (FIG. 2) is produced.

Therefore, the velocity limit controller 11 operates as follows: when the antennas of a vehicle traversing the vehicle pathway 1 (FIG. 3) intercept the signal from the transposed cable 8 (FIG. 3) the enable signal F (FIGS. 4 and 5) becomes high thereby allowing an output from the digital to analog converter 43 and sending from the distance logic generator 44 to the distance counter 46, the predetermined distance of the vehicle pathway over which the velocity limit signal is to be produced. As the vehicle continues along the pathway, the enable signal F remains high but the distance counter signal E pulses low each time the vehicle travels one-half the distance between crossover points on the transposed cable. Using the distance counter signal E, the distance counter 46 determines (within one half the distance between transposed cable crossover points) the remaining pathway distance over which a velocity limit signal is to be produced. According to a predetermined function of this remaining pathway distance, the profile function generator 48 produces an output which, after being converted into analog form in the digital to analog converter 43, is the velocity limit signal G (FIG. 2) which is compared with the ATO signal in the auctioneering circuit 12 (FIG. 3).

As was mentioned earlier, the inputs to the distance logic generator 44 may be manual or automatic. Manual inputs may be supplied by a suitable on-board controller 10 (FIG. 3) which is well known in the art. Automatic inputs may be supplied if the velocity limit controller 11 is equipped with an additional signal detector for each additional input desired. Since the signal detectors are sensitive to predetermined frequencies, it is possible to input a bit of information to the distance logic generator 44 by triggering an associated signal detector with its responsive frequency. For example, inputs 54 and 56 to distance logic generator 44 may be supplied by signal detectors 50 and 52 (FIG. 4) respectively by transmitting over the transposed cable frequencies (different from other signal detector frequencies and from the base frequency) to which signal detectors 50 and 52 are sensitive.

Also, it will be seen that by using read only memories to construct the profile function generator 48, this system will accurately and economically limit velocity according to any selected one of a multiple of predetermined singular functions of practical pathway distances. Through changing only the selected predetermined profile function generator output by a special input to the distance logic generator, which is carried through the distance counter, the velocity limit controller can cause the vehicle to stop in accordance with a stopping profile completely different from velocity limit signal G. Likewise, the velocity limit controller can limit the vehicle speed for another purpose, e.g., to allow the vehicle to safely negotiate a sharp curve. Although a profile function generator comprised of read only memories could, at one time, contain many predetermined functions of pathway distance any of which would be immediately available, should a different control profile be desired the profile function generator could be readily changed for this purpose.

Figure 6A:
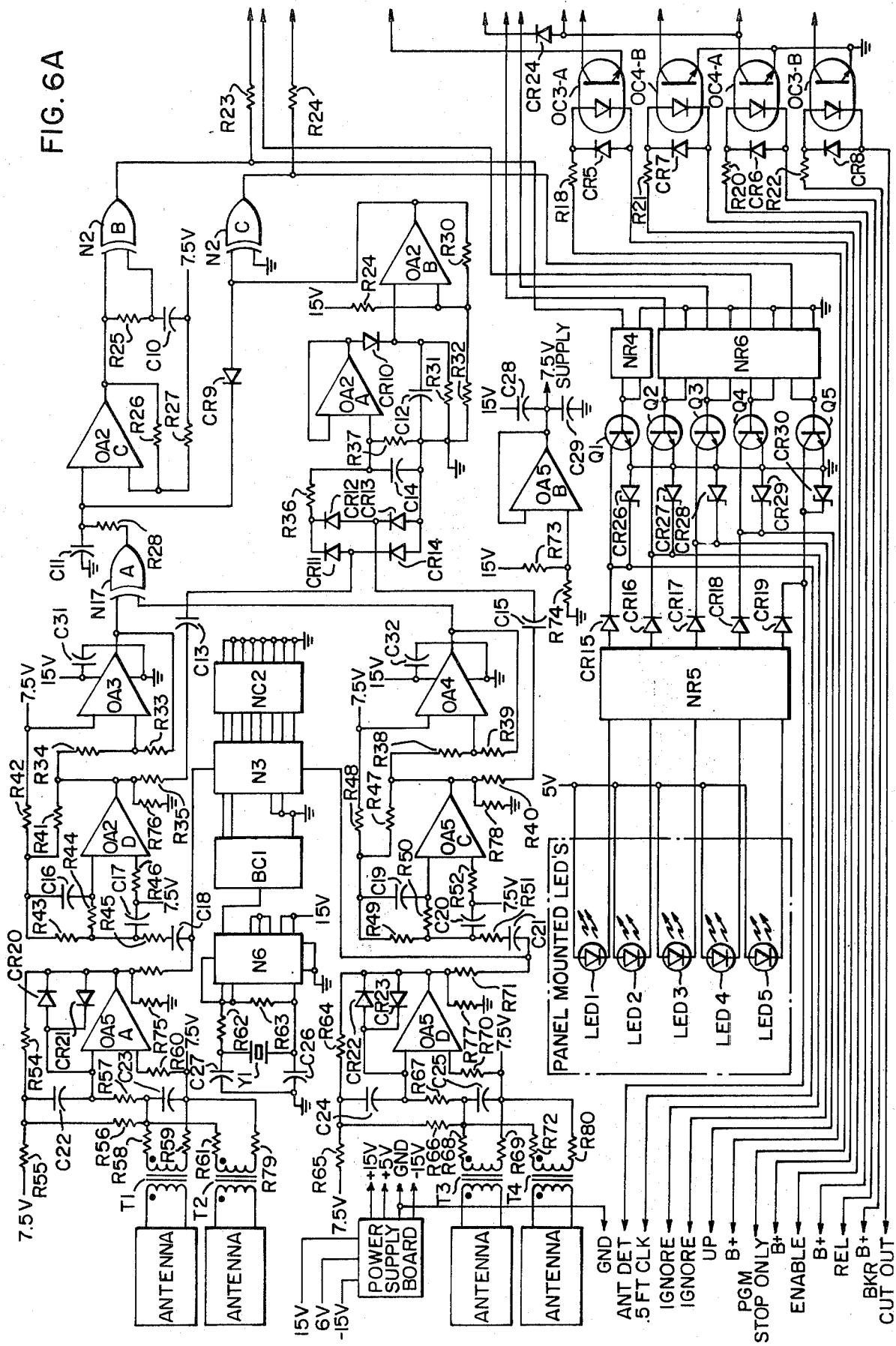
FIGS. 6A and 6B illustrate a detailed example of the preferred embodiment of the present invention.
Figure 6B:
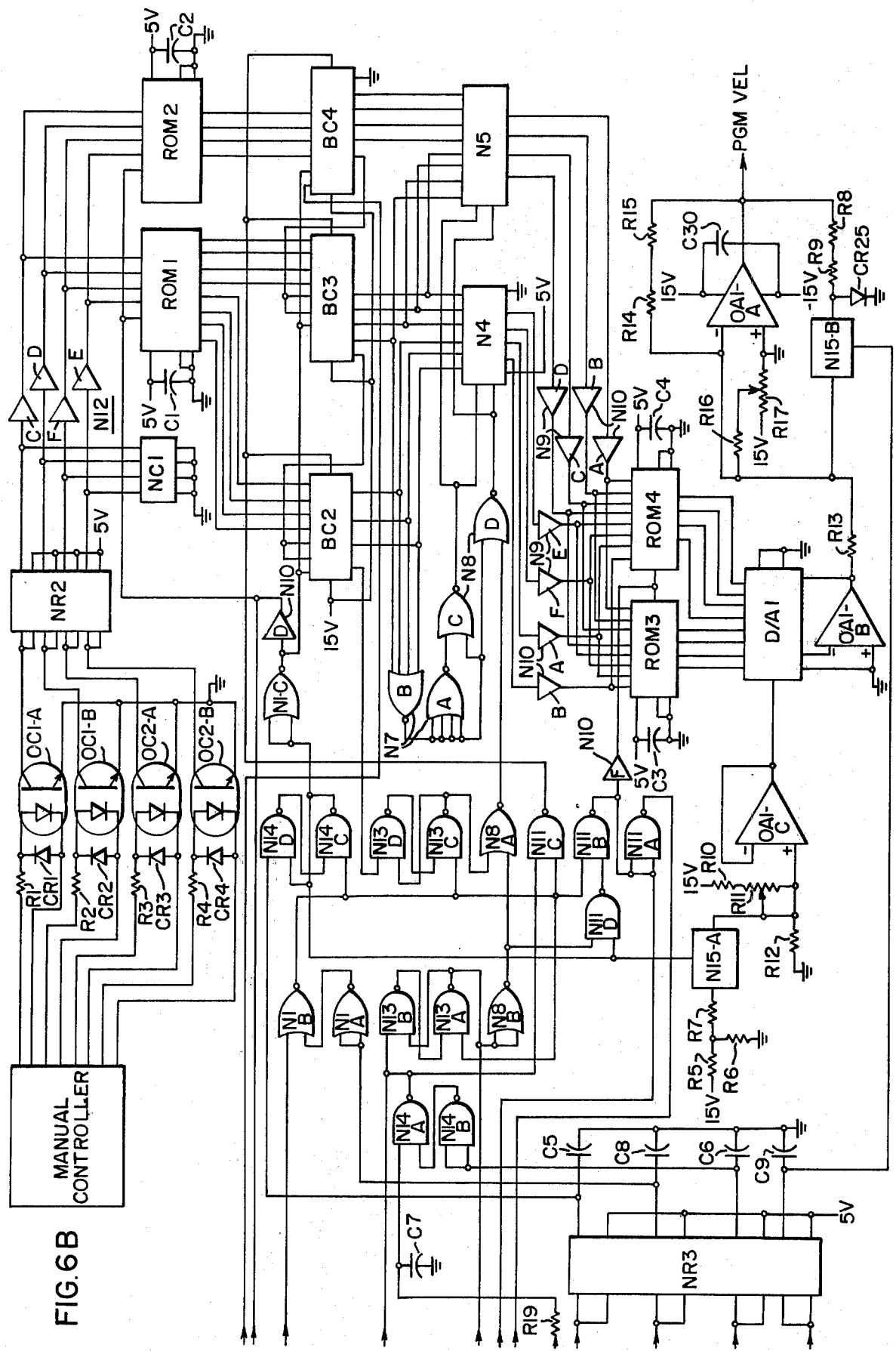

The following is a list of parts which has been used to actually produce the specific embodiment of the present invention which is shown in the detailed drawings of FIG. 6A and FIG. 6B.

| COMPONENT IDENTITY | PART IDENTITY |
| --- | --- |
| BC1 | Counter Divider 4024A |
| C1, C2, C3 | Capacitor .01UF |
| C4, C5 | |
| C7 thru C11, C14, C30 thru C32 | Capacitor .1UF |
| C6 | Capacitor .056UF |
| C12, C28, C29 | Capacitor 1UF |
| C13, C15, C18, C20, C21, C23, C25, C17 | Capacitor .001UF |
| C16, C19, C22, C24 | Capacitor 270PF |
| C26 | Capacitor 27PF |
| C27 | Capacitor 150PF |
| CR1 thru CR4 | Diode 1N914 |
| CR5 thru CR25 | Diode 1N914 |
| CR26 thru CR30 | Diode 1N5366B |
| BC2, BC3, BC4 | Counter Divider 4029A |
| N4, N5 | Gate Array 4019A |
| DA-1 | D/A Converter AD7520 |
| N7 | Dual 4 I/P 4002A |
| N8, N1 | Quad 2 I/P 4001A |

-continued

| COMPONENT IDENTITY | PART IDENTITY |
|---|---|
| N9, N10 | Buffer/Converter 4050A |
| N11, N13 N14 | Quad 2 I/P 4011A |
| N15 | Multiplex 4016A |
| N2 | Gate Array MC14507 |
| N3 | Multiplexers/Demultiplexers 4052A |
| N6 | Gate Array 4007A |
| NC1 | Capacitor Array .1UF |
| NR1, NR7 | Resistor Array 10K |
| NR2 | Resistor Array 100K |
| NR4, NR6 | Resistor Array 4.7K |
| NR5 | Resistor Array 330 |
| OA1, OA2, OA5 | Quad Oper Ampl LM324 |
| OA3, OA4 | Oper Ampl UA709 |
| OC1, OC2 | Optical Coupler MCT6 |
| Q1 thru Q5 | Transistor 2N2222 |
| R1, R2, R3, R4 | Resistor 3.32K |
| R6 | Resistor 31.6K |
| R14 | Resistor 38.3K |
| R27 | Resistor 46.4K |
| R15, R7 | Resistor 1.78K |
| R34, R38 | Resistor 9.09K |
| R11 | Potentiometer 20K |
| R13, R23, R24, R25, R41, R47 R54, R64 | Resistor 10K |
| R16, R19, R37 | Resistor 100K |
| R17 | Potentiometer 100K |
| R26 | Resistor 390K |
| R28, R29 | Resistor 14.7K |
| R30, R43, R49, R56, R12, R66, R68 | Resistor 51.1K |
| R31 | Resistor 2.2M |
| R32, R35, R40, R55, R65, R73, R74 | Resistor 1K |
| R33, R39 | Resistor 196K |
| R36 | Resistor 4.64K |
| R44, R50, R57, R67 | Resistor 16.2K |
| R45, R51, R53, R58, R59, R69, R71, R61, R72, R79, R80 | Resistor 26.1K |
| R46, R52, R60, R70 | Resistor 75K |
| R62 | Resistor 21.5K |
| R63 | Resistor 22M |
| R75 thru R78R9 | Resistor 5.11K |
| ROM 1 | 256 BIT Programmable ROM 1M5600 |
| ROM 3 | 1024 BIT Programmable ROM 1M5623 |
| T1, T2, T3, T4 | Transformer |
| XA1, XA2 | Socket 16 PIN |
| Y1 | Crystal 113.125KHz |
| P1 | Connector |
| R8, R10 | Resistor 90.9K |
| R42, R48 | Resistor 511 |
| ROM 2 | 256 BIT Programmable ROM 1M5600 |
| ROM 4 | 1024 BIT Programmable ROM 1M5623 |
| NC2 | Capacitor Array .1UF |
| NR3 | Resistor Array 100K |
| OC3, OC4 | Optical Coupler MCT6 |
| R18, R20 R21, R22 | Resistor 3.32K |
| N12 | Buffer/Converter 4050A |

I claim:

1. In a speed control apparatus for a vehicle operative with a pathway, including at least one vehicle pathway zone in which the movement speed of said vehicle is to be controlled, the combination of:
 first means for providing a first signal in accordance with the movement of said vehicle within said vehicle pathway zone;
 second means responsive to said first signal for establishing a predetermined distance magnitude for said vehicle pathway zone;
 third means responsive to said first signal and said distance magnitude for determining the portion of said vehicle pathway zone which said vehicle has not traversed;
 means responsive to said first signal and operative with said third means for providing a predetermined speed limiting control signal operative to control the speed of said vehicle in said zone;
 means for providing a second signal in relation to said vehicle pathway zone; and
 means responsive to said second signal for providing information to said second means.

2. In an automated transportation system having a pathway and at least one vehicle for traversing said pathway, with said pathway including a predetermined speed control zone in which the movement speed of said vehicle is to be limited and a signal antenna along said pathway operative with said vehicle, the system comprising:
 means for providing a first signal in conjunction with said signal antenna and in accordance with the movement of said vehicle within said pathway zone;
 means responsive to said first signal for establishing the distance magnitude of said pathway zone;
 means responsive to said first signal and said distance magnitude for determining the traversal of said vehicle in relation to the remaining portion of said established pathway zone which said vehicle has not traversed;
 means responsive to said first signal and operative with said traversal determining means for providing a predetermined speed control signal for limiting the speed of said vehicle;
 means for providing a second signal; and
 means responsive to said second signal and operative with said distance magnitude establishing means in relation to said distance magnitude.

3. In a transportation vehicle control system including at least one vehicle, a pathway for said vehicle to travel having a zone in which the vehicle speed is to be limited, a speed controller for said vehicle and signal means for providing a first control signal and a second control signal in relation to said pathway zone, said system comprising:
 sensing means for detecting null conditions in said first control signal;
 switching means for providing an output in a first state whenever said sensing means detects a null condition and for otherwise providing said output in a second state;
 distance logic means for establishing a distance magnitude for said pathway zone in relation to predetermined input parameters;
 distance counting means operative with said switching means for determining the portion of the pathway zone which the vehicle has not traveled;

means operative with said distance counting means for providing a predetermined speed limiting signal profile; and means responsive to said second control signal for providing information to said distance logic means.

4. In control apparatus operative with at least one train vehicle travelling along a pathway in accordance with a desired speed for said vehicle in relation to a predetermined zone of said pathway having means providing one frequency signal and another frequency signal, said apparatus comprising:

first and second means responsive to said one frequency signal and having respective outputs at a first state when there is no null condition in the one frequency signal and at a second state when there is a null condition in the one frequency signal;

first switching means providing an output at a first state when one of said first and second means is providing an output at a second state and providing an output at a second state when both of said first and second means are providing an output at a first state;

second switching means whose output is at a first state when the output of both said first and second means is at a second state and whose output is at a second state when the output of either said first or second means is at a first state;

distance logic means for establishing a distance value for said pathway zone in relation to predetermined parameters and in relation to said second switching means;

distance counting means for determining the portion of the pathway zone which the vehicle has not traveled in relation to said first switching means and in relation to said distance logic means;

profile means for providing a predetermined speed limiting signal in relation to said distance counting means; and means responsive to said another frequency signal for providing information to said distance logic means.

5. The apparatus of claim 4 in which said distance logic means provides an output whenever the output of said second switching means is at a second state.

6. The apparatus of claim 4 in which said profile means provides an output whenever the output of said second switching means is at a second state.

7. The apparatus of claim 4 in which said output of said profile means is a function of at least both the second and third time derivatives of the output of said distance counting means.

8. The apparatus of claim 4 in which said profile means provides an output which may be any predetermined singular function of the output of said distance counting means.

9. The apparatus of claim 4 in which said profile means provides an output which is a selected one of a multiple of predetermined functions of the output of said distance counting means.

10. The apparatus of claim 4 including:

said another frequency signal responsive means providing said distance logic means with values for said predetermined parameters.

11. In a method of controlling a transportation system including a pathway, a vehicle for traversing said pathway, and a speed controller operative with said vehicle in relation to a predetermined pathway zone in which the speed of said vehicle is to be controlled, the method comprising:

providing first signals in accordance with the movement of said vehicle within said pathway zone;

establishing a predetermined distance magnitude for said pathway zone;

determining in response to said first signals and said distance magnitude the portion of said distance magnitude which said vehicle has not yet traversed;

providing in response to said first signals a predetermined speed control signal for controlling the speed of said vehicle in relation to said determined portion of said distance magnitude;

providing second signals; and providing in response to said second signals information for establishing said predetermined distance magnitude.

12. The method of controlling a transportation system including at least one vehicle, a pathway for said vehicle, a speed controller for determining the speed of said vehicle, and at least one zone of said pathway in which the speed of said vehicle as determined by said speed controller is to be controlled in relation to predetermined input parameters, said method including the steps of:

providing first signals as a function of the movement of said vehicle in relation to said zone;

determining the distance size of said zone;

establishing in response to said first signals and in relation to said distance size the portion of said zone which said vehicle has not traveled;

controlling in response to said first signals the speed of said vehicle in accordance with a predetermined function of said portion of said zone which said vehicle has not traveled;

providing second signals in accordance with predetermined input parameters; and establishing said portion of said zone in response to said second signals.

13. A method of controlling a transportation system with at least one vehicle, a pathway for said vehicle, a speed controller for determining the speed of said vehicle, and at least one zone of said pathway in which the speed determined by said controller is to be controlled in relation to predetermined input parameters, the method including the steps of:

providing a first signal to said vehicle over a pathway distance which includes said zone;

determining the distance size of the zone over which the speed of said vehicle is to be controlled;

detecting null conditions in said first signal;

translating said detected null conditions into a determination of the portion of said zone that said vehicle has not traveled;

controlling in response to said first signal the speed of said vehicle over said determined zone in relation to said translated portion of said zone;

providing a second signal in accordance with a desired input in relation to said distance size; and determining said distance size in response to said second signal.

14. In a method of controlling a transportation system having at least one vehicle, a pathway for said vehicle, a speed controller for determining the speed of said vehicle, and at least one zone of said pathway in which the speed determined by said controller is to be limited in relation to one or more input parameters, the method comprising the steps of:

providing a signal to said vehicle over a pathway distance which includes said zone;

detecting a first set of null conditions in said signal;
detecting a second set of null conditions in said signal;
producing a counter signal which is at a first state when a null condition is detected in either one of said first and said second set of null conditions and which is at a second state otherwise;
producing an enable signal which is at a first state when a null condition is detected in both of said first and said second sets of null conditions and is at a second state otherwise;
determining the distance size of the zone over which said determined speed is to be limited;
translating said counter signal and said enable signal into a remaining distance signal representing the portion of said zone that said vehicle has not traveled; and
limiting the speed of said vehicle over said portion of the pathway zone and in relation to said remaining distance signal.

15. The method of claim 14 in which the limited speed of said vehicle is a predetermined function of said remaining distance signal.

16. The method of claim 14 in which the limited speed of said vehicle is in accordance with a desired velocity limit predetermined by said remaining distance signal.

17. The method of claim 14 in which the speed of said vehicle is limited as a function of at least the second and third time derivatives of said remaining distance signal.

18. The method of claim 14 with said signal provided to said vehicle containing at least one selected frequency and including;
detecting null conditions according to said selected frequency; and
establishing said input parameters in relation to the latter detected null conditions.

* * * * *